(12) United States Patent
Immel

(10) Patent No.: US 12,117,190 B2
(45) Date of Patent: Oct. 15, 2024

(54) HEAT PUMP SYSTEM AND METHOD FOR OPERATING A HEAT PUMP SYSTEM OF THIS TYPE

(71) Applicant: Viessmann Climate Solutions SE, Allendorf (DE)

(72) Inventor: Markus Immel, Gladenbach (DE)

(73) Assignee: Viessmann Climate Solutions SE, Allendorf (DE)

( * ) Notice: Subject to any disclaimer, the term of this patent is extended or adjusted under 35 U.S.C. 154(b) by 316 days.

(21) Appl. No.: 17/790,286

(22) PCT Filed: Feb. 10, 2021

(86) PCT No.: PCT/DE2021/100133
§ 371 (c)(1),
(2) Date: Jun. 30, 2022

(87) PCT Pub. No.: WO2021/160221
PCT Pub. Date: Aug. 19, 2021

(65) Prior Publication Data
US 2023/0042899 A1 Feb. 9, 2023

(30) Foreign Application Priority Data
Feb. 13, 2020 (DE) .................... 10 2020 103 743.0

(51) Int. Cl.
*F25B 30/02* (2006.01)
*F24D 3/18* (2006.01)
*F24D 19/10* (2006.01)
*F24F 11/36* (2018.01)
*F25B 49/00* (2006.01)

(52) U.S. Cl.
CPC ............... *F24F 11/36* (2018.01); *F24D 3/18* (2013.01); *F24D 19/1039* (2013.01);
(Continued)

(58) Field of Classification Search
CPC . F24F 11/36; F25B 30/02; F25B 49/02; F25B 49/005; F25B 2339/047;
(Continued)

(56) References Cited

U.S. PATENT DOCUMENTS

2021/0231329 A1 7/2021 Shirai et al.

FOREIGN PATENT DOCUMENTS

| DE | 10 2011 011 210 A1 | 8/2012 |
| DE | 10 2016 106 061 A1 | 10/2017 |
| EP | 2 759 787 A1 | 7/2014 |
| EP | 3 351 868 A1 | 7/2018 |

(Continued)

OTHER PUBLICATIONS

Notification of Transmittal of Translation of the International Preliminary Report on Patentability in PCT/DE2021/100133, mailed Aug. 25, 2022 with attached English translation of the International Preliminary Report on Patentability in PCT/DE2021/100133 dated Aug. 11, 2022 and Written Opinion of the International Searching Authority in PCT/DE2021/100133 dated Jun. 7, 2021.

(Continued)

*Primary Examiner* — Jonathan Bradford
(74) *Attorney, Agent, or Firm* — Collard & Roe, P.C.

(57) ABSTRACT

A heat pump system and a method for operating this system type includes a heat pump circuit for a heat pump circuit medium flowing through a primary side of a heat exchanger, and a heating circuit for a heating circuit medium flowing through the heat exchanger secondary side. A heat circuit pump is connected upstream of the exchanger secondary side when viewed in the heating circuit medium operating flow direction. When viewed in the heating circuit medium operating flow direction, a check valve connected downstream of the heating circuit pump and upstream of the secondary side closes when a heating circuit medium flows opposite the operating flow direction, and a degassing unit connected downstream of the secondary side when viewed (Continued)

in the operating flow direction prevents a flow of the heating circuit medium in the operating flow direction from a predefined gas amount in the heating circuit medium.

13 Claims, 1 Drawing Sheet

(52) U.S. Cl.
CPC ........ *F25B 30/02* (2013.01); *F24D 2200/123* (2013.01); *F25B 49/005* (2013.01); *F25B 2339/047* (2013.01); *F25B 2400/12* (2013.01); *F25B 2500/221* (2013.01)

(58) Field of Classification Search
CPC .. F25B 2400/12; F25B 2500/221; F24D 3/18; F24D 19/039; F24D 2200/123; F24D 19/1039

See application file for complete search history.

(56) References Cited

FOREIGN PATENT DOCUMENTS

| EP | 3587947 A1 | * | 1/2020 | .............. F24F 11/36 |
|---|---|---|---|---|
| EP | 3967943 A1 | * | 3/2022 | .............. F24D 17/02 |
| EP | 4345381 A1 | * | 4/2024 | .............. F24D 17/02 |
| EP | 4379267 A1 | * | 6/2024 | .............. F24D 11/02 |
| JP | 2016-095130 A | | 5/2016 | |
| WO | 2019/239556 A1 | | 12/2019 | |

OTHER PUBLICATIONS

International Search Report in PCT/DE2021/100133, dated Jun. 7, 2021.

* cited by examiner

HEAT PUMP SYSTEM AND METHOD FOR OPERATING A HEAT PUMP SYSTEM OF THIS TYPE

CROSS REFERENCE TO RELATED APPLICATIONS

This application is the National Stage of PCT/DE2021/100133 filed on Feb. 10, 2021, which claims priority under 35 U.S.C. § 119 of German Application No. 10 2020 103 743.0 filed on Feb. 13, 2020, the disclosure of which is incorporated by reference. The international application under PCT article 21(2) was not published in English.

BACKGROUND OF THE INVENTION

1. Field of the Invention

The invention relates to a heat pump system as well as a method for operating a heat pump system of this type.

2. Description of the Related Art

A heat pump system of the type mentioned in the introduction is disclosed in the document DE 10 2011 011 210 A1. This heat pump system consists of a heat pump circuit for a heat pump circuit medium flowing through a primary side of a heat exchanger, and a heating circuit for a heating circuit medium flowing through a secondary side of the heat exchanger, wherein a heating circuit pump is connected upstream of the secondary side of the heat exchanger when viewed in the operating flow direction of the heating circuit medium. Preferably, the aforementioned heating circuit medium is typically water in this case and also hereinafter. Moreover, it applies here and hereinafter, that when the heat pump system is used as intended the heating circuit medium is pumped in only one direction through the heating circuit, namely in the aforementioned operating flow direction.

SUMMARY OF THE INVENTION

The object of the invention is to improve a heat pump system of the type mentioned in the introduction. In particular, a heat pump system is intended to be provided which automatically prevents a further flow in the heating circuit in the event of a gas leak at the heat exchanger.

This object is achieved by a heat pump system of the type mentioned in the introduction by the features according to one aspect of the invention. Relative to the method, this object is achieved according to another aspect of the invention.

According to the invention, it is thus provided that, when viewed in the operating flow direction of the heating circuit medium, a check valve is provided which is connected downstream of the heating circuit pump and upstream of the secondary side, and which is designed to close when there is a flow of heating circuit medium opposite the operating flow direction, and wherein a degassing device is connected downstream of the secondary side, when viewed in the operating flow direction, which is designed to prevent a flow of the heating circuit medium in the operating flow direction from a predefined gas amount in the heating circuit medium. In terms of relative to the method, therefore, it is provided that from a predefined gas amount of the heat pump circuit medium in the heating circuit medium, on the one hand, the check valve closes and, on the other hand, the degassing device prevents a flow of the heating circuit medium in the operating flow direction.

In other words, the heat pump system according to the invention is thus characterized in that a flow of the heating circuit medium is automatically prevented if a gas leak were to occur at the heat exchanger, i.e. a passage of, in particular combustible, heat pump circuit medium from the primary to the secondary side of the heat exchanger. In this case, on the one hand, it is ensured by the check valve that the heat pump circuit medium does not flow opposite the operating flow direction of the heating circuit medium in the direction of the pump. On the other hand, the degassing device also ensures that the heat pump circuit medium which has passed through does not spread in the operating flow direction of the heating circuit medium. In this case, it is also particularly preferably provided that the heating circuit pump is designed to switch off automatically in the case of a shortfall in the supply quantity of heating circuit medium, i.e. in the case of said gas leak not only is the entry of, in particular combustible, heat pump circuit medium in the heating circuit effectively prevented, but it is even ensured that the circulation of the heating circuit is automatically shut down completely.

Other advantageous developments of the heat pump system according to the invention are discussed below.

For the sake of completeness, reference is also made to the documents EP 3 351 868 A1 and DE 10 2016 106 061 A1.

BRIEF DESCRIPTION OF THE DRAWINGS

The heat pump system according to the invention, including its advantageous developments according to its further aspects, is described in more detail hereinafter with reference to the illustration of two exemplary embodiments.

In the drawings.

DETAILED DESCRIPTION OF THE PREFERRED EMBODIMENTS

Figure 1:
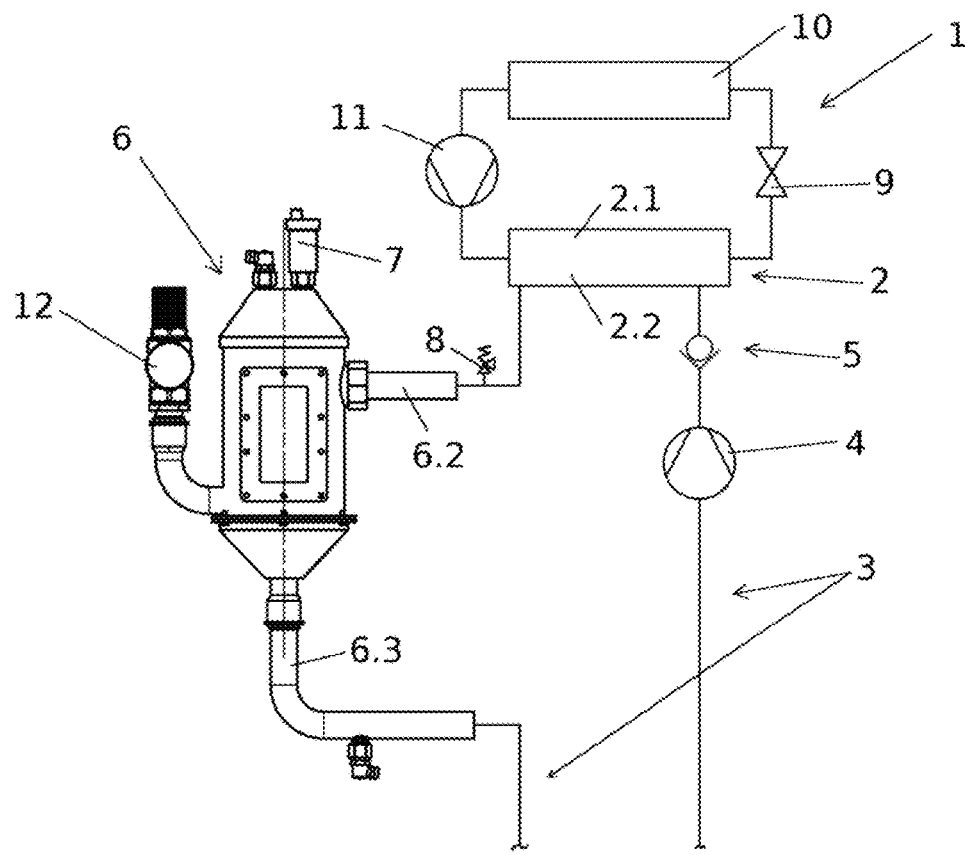
FIG. 1 shows largely schematically the heat pump system according to the invention with the check valve and the degassing device.

The heat pump system shown in the figures consists in the known manner of a heat pump circuit 1 for a heat pump circuit medium flowing through a primary side 2.1 of a heat exchanger 2, and a heating circuit 3 for a heating circuit medium flowing through a secondary side 2.2 of the heat exchanger 2, wherein a heating circuit pump 4 is connected upstream of the secondary side 2.2 of the heat exchanger 2 when viewed in the operating flow direction of the heating circuit medium.

Moreover, it is preferably provided in a manner known per se that the heat pump circuit 1 has, in addition to the heat exchanger 2, a throttle device 9, a further heat exchanger 10 and a compressor 11. If the heat pump system is used for heating a building (heating mode) the heat exchanger 2 operates in this case as a condenser and the further heat exchanger 10 operates as an evaporator, typically heat being supplied thereto via an environmental heat source such as air heat or geothermal heat. If the heat pump system, however, is used for cooling (which is also possible), the heat exchanger 2 is correspondingly designed to operate as an evaporator.

Moreover, when using the heat pump system in heating mode, it is provided in a manner known per se that the heating circuit 3 selectively comprises heat discharge devices (for example radiators or underfloor heating) and/or heat accumulators (for example a hot water tank).

It is thus essential to the heat pump system according to the invention that firstly, when viewed in the operating flow direction of the heating circuit medium, a check valve 5 is provided which is connected downstream of the heating circuit pump 4 and upstream of the secondary side 2.2, and which is designed to close when there is a flow of heating circuit medium opposite the operating flow direction, and that secondly a degassing device 6 is connected downstream of the secondary side 2.2, when viewed in the operating flow direction, which is designed to prevent a flow of the heating circuit medium in the operating flow direction from a predefined gas amount (of heat pump circuit medium) in the heating circuit medium. In terms of relative to the method, it is provided that from a predefined gas amount of the heat pump circuit medium in the heating circuit medium, on the one hand, the check valve 5 closes and, on the other hand, the degassing device 6 prevents a flow of the heating circuit medium in the operating flow direction. As has been already described in the introduction, the effect of these measures is that, in the event of a leak at the heat exchanger 2, the heat pump circuit medium is in any case only able to pass to a limited extent into the heating circuit 3.

In this case, it is also particularly preferably provided that a pressure relief valve 12 is provided on the degassing device 6, the heat pump circuit medium being able to be discharged thereby to the surroundings of the building in the case of a leakage.

The above-mentioned measure "predefined" means in this case that the degassing device 6 is designed such that the flow is prevented only from a specific leakage rate, i.e. according to the invention leakages below this "predefined" amount are tolerated or expelled via the venting device 7, described in more detail below, since they do not pose any danger. A small leakage over a longer period of time would, however, naturally be "noticed" by the heat pump itself and then also lead to the shut-down thereof.

In this case, it is particularly preferably provided that the heat exchanger 2 and/or the degassing device 6 is or are selectively arranged outside a building partially receiving the heating circuit 3, i.e. according to the invention it is ensured that the heat pump circuit medium is not able to pass into the building in the first place and cause possible damage therein.

In order to assist this safety function further, as already described, it is also particularly preferably provided that the heating circuit pump 4 is designed to switch off automatically, or switches off automatically, in the case of a shortfall in a predetermined supply quantity of heating circuit medium (for the heating circuit pump 4), i.e. the heating circuit pump 4 shuts down as soon as there is no longer sufficient heating circuit medium at the pump inlet thereof, i.e. there is the risk that the heating circuit pump runs "empty". The aforementioned shortfall in this case results from the effect of the degassing device 6, described in more detail below, which ensures that in the event of a leakage in the heat exchanger 2 the heating circuit medium is no longer able to circulate in the heating circuit 3.

Relative to the degassing device 6 (and unless indicated otherwise the following descriptions apply to all of the embodiments of the degassing devices according to the invention) in this case it is particularly preferably provided that this degassing device is designed as a container with an inlet 6.2 and with an outlet 6.3 for the heating circuit medium. In this case, it is further particularly preferably provided that during the operation of the heat pump system as intended the inlet 6.2 is arranged above the outlet 6.3. Moreover, it is particularly preferably provided that the outlet 6.3 is arranged at a lowest point 6.4 on the container. In this case, the container preferably also has a volume for receiving heating circuit medium of at least 1.5 liters, particularly preferably at least 2.5 liters, quite particularly preferably at least 3.5 liters. In this case, it is further preferably provided that a flow rate of the heating circuit medium is reduced by at least 50%, preferably 75% at the transition from the inlet 6.2 to the container. Quite particularly preferably, in this case it is provided that the flow rate in the container is at most 0.4 m/s, quite particularly preferably at most 0.3 m/s. This measure brings with it the quite considerable advantage here that gaseous heat pump circuit medium which is possibly located in the heating circuit medium is not entrained to the outlet 6.3 but is able to rise to the top in the container and then be discharged.

For implementing the flow prevention it is also particularly preferably provided that the degassing device 6 has a floater 6.1, forming a stopper in the event of a leak.

Figure 2:
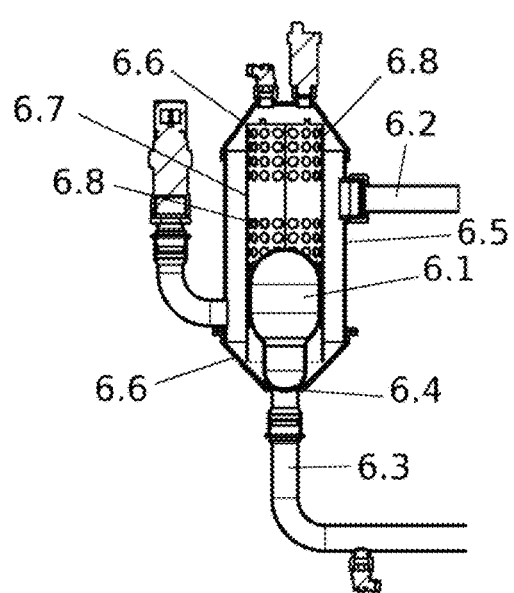
FIG. 2 shows in section a first embodiment of the degassing device.

In the embodiment according to FIG. 2, this floater 6.1 is designed as an elongated plug tapering at the lower end thereof. In the embodiment according to FIG. 3, however, the floater 6.1 is designed as a ball. Naturally, in this case it is common to all embodiments that the floater 6.1 has a lower density than the heating circuit medium and accordingly floats therein if the degassing device 6 is filled with said heating circuit medium. However, if the heating circuit medium has been forced out of the degassing device by the heat pump circuit medium, in the case of a leak, the floater 6.1 closes the outlet 6.3 which has already been mentioned above. Alternatively, to put it again in other words, it is thus particularly preferably provided that the floater 6.1 is designed to float in the heating circuit medium (at the top in the container when the container is completely filled with heating circuit medium) below the predefined gas amount, and to close the outlet 6.3 above the predefined gas amount.

To this end, it is also particularly preferably provided that during the operation of the heat pump system as intended the floater 6.1 is arranged above the lowest point 6.4 in the container. Moreover, it is preferably provided that during the operation of the heat pump system as intended the floater 6.1 is mounted so as to be vertically displaceable inside the container.

Figure 3:
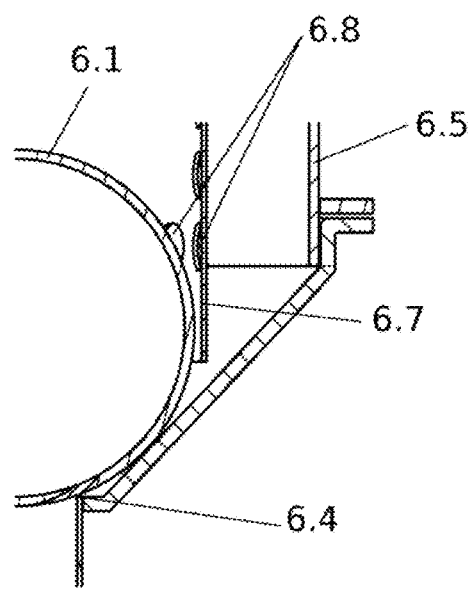
FIG. 3 shows in section a part of a second embodiment of the degassing device.

Considered even more precisely—and this also applies to all of the embodiments of the degassing device 6—it is particularly preferably provided that the above-mentioned container is formed from a cylindrical sleeve 6.5 which is closed on both sides by cover elements 6.6. In this case, it is also particularly preferred that a preferably tubular guide element 6.7 for the floater 6.1 is arranged in the container. As shown in FIGS. 2 and 3, in this case it is also particularly preferably provided for flow calming that the guide element 6.7 has through-openings 6.8 for the heating circuit medium, i.e. the heating circuit medium flows from the inlet 6.2 into an outer region of the container and therefrom through the through-openings 6.8 into an inner region of the container, where the floater 6.1 is movably mounted, and which opens into the outlet 6.3.

Finally, it is further preferably provided that a safety valve 8 is selectively arranged between the heat exchanger 2 and the degassing device 6 and/or that the degassing device 6 has a venting device 7 (for rapid venting in the case of small gas amounts), wherein additionally—as shown—a further valve may also be provided on the degassing device 6 for manual venting.

The heat pump system according to the invention, without a leak or leakage at the heat exchanger 2, i.e. when operating correctly, functions as follows:

The heating circuit medium coming from the heat exchanger 2 flows via the inlet 6.2 into the container of the degassing device 6. This container is filled with heating circuit medium, so that the floater 6.1, guided by the guide element 6.7 provided with through-openings 6.8, floats at the top in the heating circuit medium. The outlet 6.3 is arranged at the lowest point 6.4 of the container, via which outlet the heating circuit medium leaves the degassing device 6 again and flows, for example, in the direction of the radiators.

If a significant leakage now occurs at the heat exchanger 2, i.e. if, in particular combustible, heat pump circuit medium (for example propane) escapes from the heat pump circuit 1, which is operated at very high pressure, in larger amounts into the heating circuit 3, which is operated at a significantly lower pressure, which is absolutely undesirable, the heating circuit medium stored in the container of the degassing device 6 is forced out of this container, such that the floater 6.1 moves down and then closes the outlet 6.3 in a sealed manner due to the high pressure in the container, until substantial amounts of the heat pump circuit medium have been blown off via the pressure relief valve 12, wherein the closure of the outlet 6.3, as described above and even promoted by the suction of the heating circuit pump 4 itself, also results in the heating circuit pump 4 stopping its operation, i.e. the entire heat pump system goes completely into fault mode, which is consistent with this type of error, wherein since the pressure relief valve 12 is designed to discharge into the open air, according to the invention it is ensured that combustible heat pump circuit medium is not able to pass into the building to be heated.

LIST OF REFERENCE NUMERALS

1 Heat pump circuit
2 Heat exchanger
2.1 Primary side
2.2 Secondary side
3 Heating circuit
4 Heating circuit pump
5 Check valve
6 Degassing device
6.1 Floater
6.2 Inlet
6.3 Outlet
6.4 Lowest point on container
6.5 Sleeve
6.6 Cover element
6.7 Guide element
6.8 Throughflow opening
7 Venting device
8 Safety valve
9 Throttle device
10 Heat exchanger
11 Compressor
12 Pressure relief valve

The invention claimed is:

1. A heat pump system, comprising
   a heat pump circuit for a heat pump circuit medium flowing through a primary side of a heat exchanger, and
   a heating circuit for a heating circuit medium flowing through a secondary side of the heat exchanger,
   wherein a heating circuit pump is connected upstream of the secondary side of the heat exchanger when viewed in the operating flow direction of the heating circuit medium,
   wherein when viewed in the operating flow direction of the heating circuit medium, a check valve is provided which is connected downstream of the heating circuit pump and upstream of the secondary side, and which is designed to close when there is a flow of heating circuit medium opposite the operating flow direction, and
   wherein a degassing device is connected downstream of the secondary side, when viewed in the operating flow direction, which is designed to prevent a flow of the heating circuit medium in the operating flow direction when an amount of gas in the heating circuit medium is equal to or greater than a predefined amount.

2. The heat pump system according to claim 1, wherein the degassing device has a floater.

3. The heat pump system according to claim 2, wherein the degassing device is designed as a container with an inlet and with an outlet for the heating circuit medium.

4. The heat pump system according to claim 3, wherein during the operation of the heat pump system as intended the inlet is arranged above the outlet.

5. The heat pump system according to claim 3, wherein the outlet is arranged at a lowest point on the container.

6. The heat pump system according to claim 3, wherein-during the operation of the heat pump system as intended the floater is arranged above the lowest point in the container.

7. The heat pump system according to claim 3, wherein during the operation of the heat pump system as intended the floater is mounted so as to be vertically displaceable inside the container.

8. The heat pump system according to claim 3, wherein the floater floats in the heating circuit medium when an amount of gas in the degassing device is below the predefined amount, and closes the outlet when an amount of gas in the degassing device is equal to or greater than the predefined amount.

9. The heat pump system according to claim 1, wherein the heating circuit pump is designed to switch off automatically when the available supply quantity of heating circuit medium at the inlet of the pump is less than a predetermined amount.

10. The heat pump system according to claim 1, wherein the heat exchanger and/or the degassing device is or are selectively arranged outside a building partially receiving the heating circuit.

11. A method for operating the heat pump system according to claim 1, wherein when an amount of gas in the degassing device is equal to or greater than the predefined amount, the check valve is closed and, the degassing device prevents a flow of the heating circuit medium in the operating flow direction.

12. The method according to claim 11, wherein the heating circuit pump switches off automatically when the available supply quantity of heating circuit medium at the inlet of the heating circuit pump is less than a predetermined amount.

13. The method according to claim 11, wherein the heating circuit medium flows via an inlet into a container of the degassing device, wherein a flow rate of the heating circuit medium is reduced by at least 50% at the transition from the inlet to the container.

* * * * *